US012092732B2

(12) United States Patent
Payton et al.

(10) Patent No.: US 12,092,732 B2
(45) Date of Patent: Sep. 17, 2024

(54) SYNTHETIC APERTURE RADAR CLASSIFIER NEURAL NETWORK

(71) Applicant: The Boeing Company, Chicago, IL (US)

(72) Inventors: David Payton, Calabasas, CA (US); Soheil Kolouri, Agoura Hills, CA (US); Kangyu Ni, Calabasas, CA (US); Qin Jiang, Oak Park, CA (US)

(73) Assignee: The Boeing Company, Arlington, VA (US)

( * ) Notice: Subject to any disclaimer, the term of this patent is extended or adjusted under 35 U.S.C. 154(b) by 329 days.

(21) Appl. No.: 17/450,161

(22) Filed: Oct. 6, 2021

(65) Prior Publication Data

US 2023/0105700 A1 Apr. 6, 2023

(51) Int. Cl.
*G01S 13/90* (2006.01)
*G01S 7/41* (2006.01)
*G01S 13/933* (2020.01)

(52) U.S. Cl.
CPC .......... *G01S 13/9027* (2019.05); *G01S 7/417* (2013.01)

(58) Field of Classification Search
CPC .............................. G01S 13/9027; G01S 7/417
See application file for complete search history.

(56) References Cited

U.S. PATENT DOCUMENTS

| | | | | |
|---|---|---|---|---|
| 2010/0052977 | A1* | 3/2010 | Sathyendra | G06F 18/10 342/25 F |
| 2021/0027113 | A1* | 1/2021 | Goldstein | G06F 18/24 |
| 2021/0073586 | A1* | 3/2021 | Sagi | G06N 3/084 |
| 2021/0192363 | A1* | 6/2021 | Kolouri | G06N 3/047 |
| 2022/0080980 | A1* | 3/2022 | Jeong | B60W 50/0097 |
| 2022/0245931 | A1* | 8/2022 | Choi | G06V 10/82 |

OTHER PUBLICATIONS

Chung, J. et al., "Empirical Evaluation of Gated Recurrent Neural Networks on Sequence Modeling," NIPS 2014 Deep Learning and Representation Learning Workshop, Dec. 11, 2014, 9 pages.

(Continued)

*Primary Examiner* — Timothy A Brainard
*Assistant Examiner* — Ismaaeel A. Siddiquee
(74) *Attorney, Agent, or Firm* — Alleman Hall & Tuttle LLP

(57) ABSTRACT

A computing system including a processor configured to train a synthetic aperture radar (SAR) classifier neural network. The SAR classifier neural network is trained at least in part by, at a SAR encoder, receiving training SAR range profiles that are tagged with respective first training labels, and, at an image encoder, receiving training two-dimensional images that are tagged with respective second training labels. Training the SAR classifier neural network further includes, at a shared encoder, computing shared latent representations based on the SAR encoder outputs and the image encoder outputs, and, at a classifier, computing respective classification labels based on the shared latent representations. Training the SAR classifier neural network further includes computing a value of a loss function based on the plurality of first training labels, the plurality of second training labels, and the plurality of classification labels and performing backpropagation based on the value of the loss function.

20 Claims, 10 Drawing Sheets

(56) References Cited

OTHER PUBLICATIONS

Werbos, P., "Backpropagation Through Time: What It Does and How to Do It," Proceedings of the IEEE, vol. 78, No. 10, Oct. 1990, 11 pages.

Jiang, Q. et al., "Target Recognition From SAR Data Using Range Profiles and a Long Short-Term Memory (LSTM) Network," U.S. Appl. No. 16/804,978, B86918 10370US.1, 65 pages.

Jiang, Q. et al., "Complex Recurrent Neutral Network for Synthetic Aperture Radar (SAR) Target Recognition," U.S. Appl. No. 63/135,553, 70186.590PV01, 65 pages.

\* cited by examiner

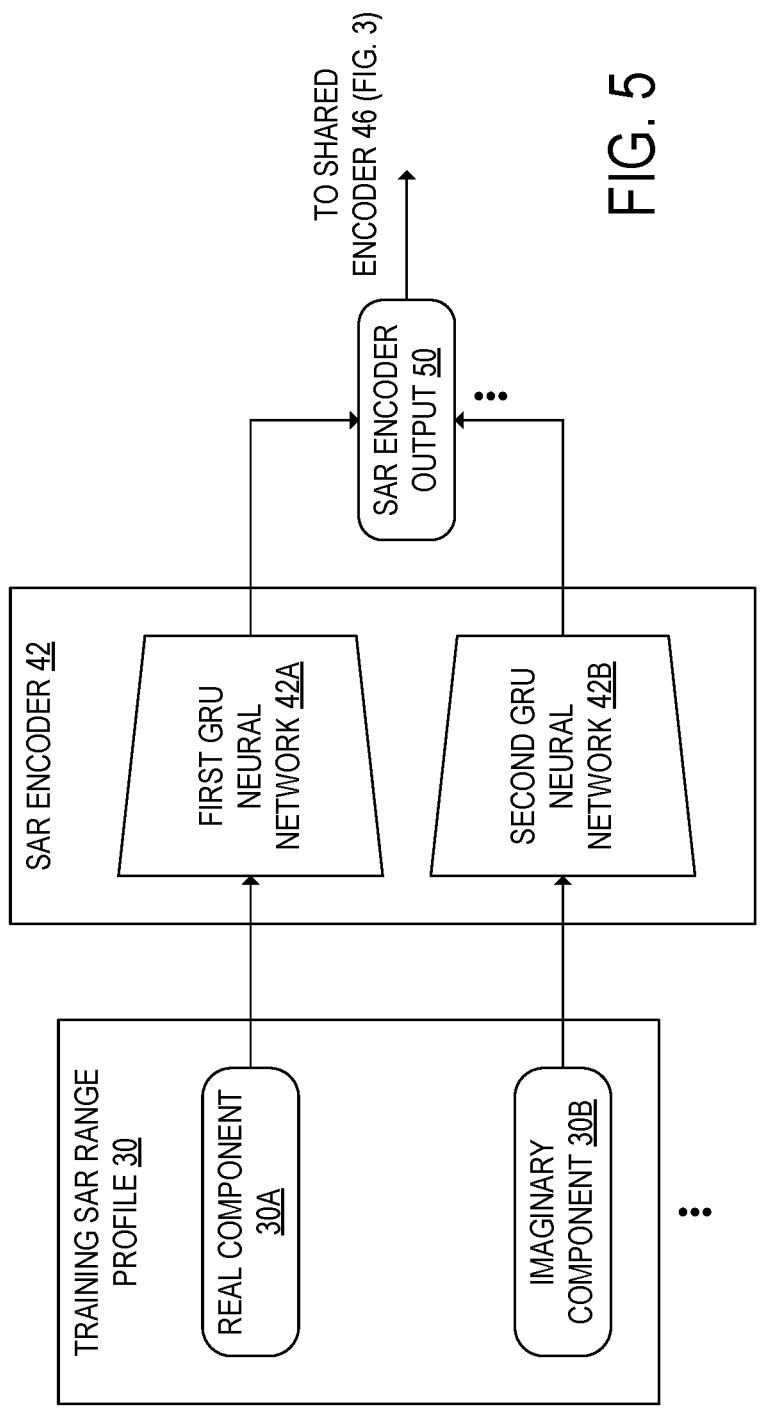

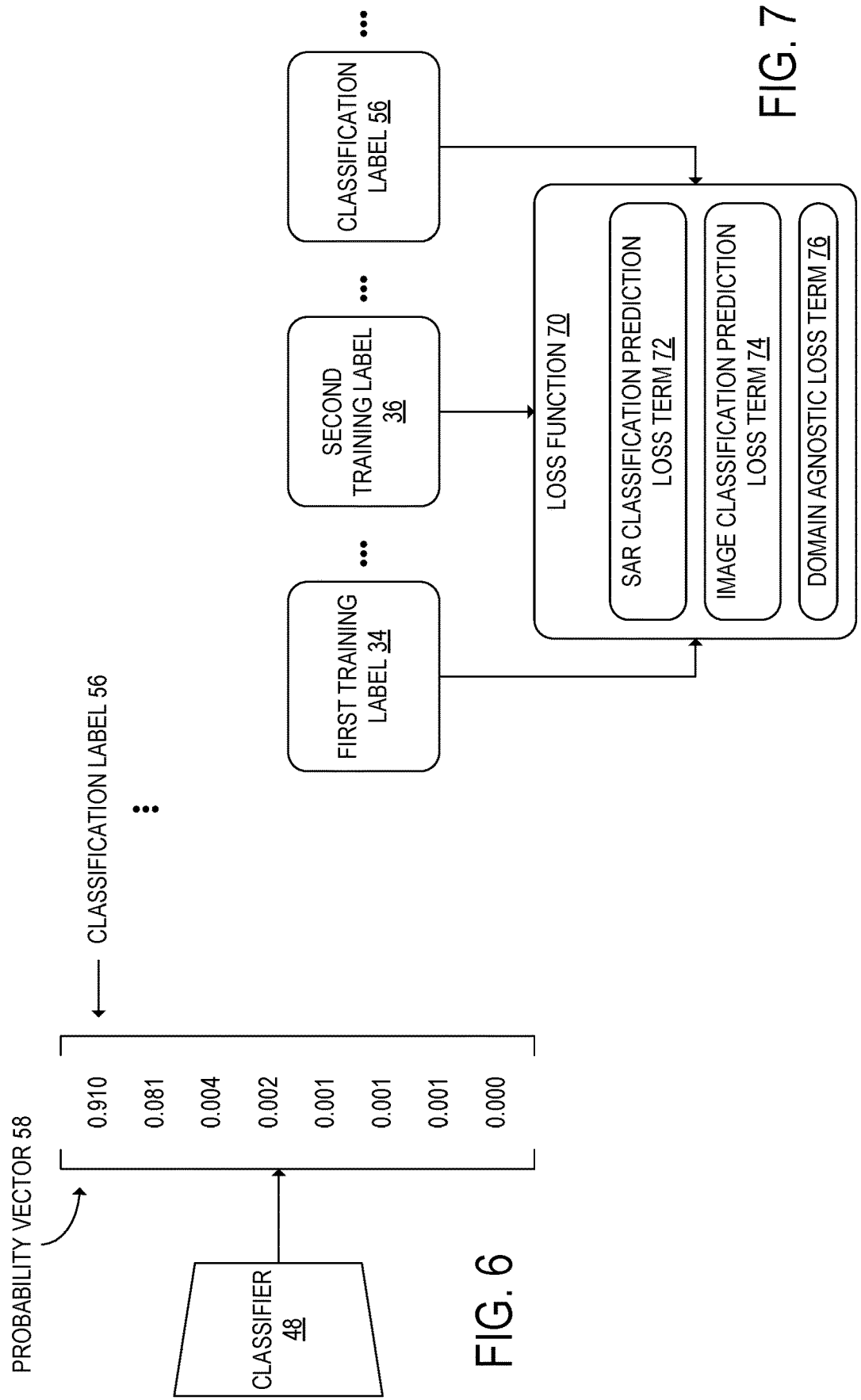

SYNTHETIC APERTURE RADAR CLASSIFIER NEURAL NETWORK

FIELD

This application is related to the use of synthetic aperture radar (SAR) in automatic target recognition (ATR).

BACKGROUND

Synthetic aperture radar (SAR) is a form of radar sensing in which transmitted radio waves that reflect off a target are received at a moving sensor. The signals received at different sensor positions are combined, thereby providing a synthetic aperture that is larger than the physical size of the receiver. The raw data collected via SAR is a range profile that includes time series data indicating an amplitude and a phase of the reflected radio signal for an imaged region. Since the synthetic aperture is larger than the physical aperture of the receiver, the range profile has a higher resolution than would be obtained from a stationary radar sensor.

SAR is frequently used when performing automatic target recognition (ATR). When SAR is used for ATR, raw SAR data in the form of SAR range profiles is typically converted into SAR images that are further processed in order to perform object recognition. These SAR images are two-dimensional representations of the SAR range profiles. However, converting SAR range profiles into SAR images is computationally expensive. Thus, methods of using SAR for ATR that convert range profiles to SAR images are frequently not suitable for onboard processing at lightweight computing devices. The computational costs associated with converting range profiles into SAR images impede the development of lightweight SAR imaging platforms with onboard ATR processing capabilities.

SUMMARY

According to one aspect of the present disclosure, a computing system is provided, including a processor configured to train a synthetic aperture radar (SAR) classifier neural network. The SAR classifier neural network includes a SAR encoder, an image encoder, a shared encoder, and a classifier. The SAR classifier neural network is trained at least in part by, at the SAR encoder, receiving a plurality of training SAR range profiles that are tagged with a respective plurality of first training labels. Training the SAR classifier neural network further includes, at the image encoder, receiving a plurality of training two-dimensional images that are tagged with a respective plurality of second training labels. Training the SAR classifier neural network further includes, at the shared encoder, receiving a plurality of SAR encoder outputs of the SAR encoder and a plurality of image encoder outputs of the image encoder and computing a plurality of shared latent representations based at least in part on the plurality of SAR encoder outputs and the plurality of image encoder outputs. Training the SAR classifier neural network further includes, at the classifier, receiving the shared latent representations and computing a respective plurality of classification labels based at least in part on the shared latent representations. Training the SAR classifier neural network further includes computing a value of a loss function based at least in part on the plurality of first training labels, the plurality of second training labels, and the plurality of classification labels. Training the SAR classifier neural network further includes, based at least in part on the value of the loss function, performing backpropagation through the classifier, the shared encoder, the SAR encoder, and the image encoder.

BRIEF DESCRIPTION OF THE DRAWINGS

FIG. 5 schematically shows a SAR encoder included in the SAR classifier neural network, according to the example of FIG. 3.

FIG. 6 schematically shows a probability vector output by a classifier included in the SAR classifier neural network, according to the example of FIG. 3.

FIG. 7 schematically shows a loss function that is computed during training of the SAR classifier neural network, according to the example of FIG. 3.

DETAILED DESCRIPTION

When performing ATR using SAR data, an object classification is generated from a SAR range profile. The object classification, for example, indicates a type of an object detected in the SAR data (e.g. a type of vehicle or a type of building), a condition of the object (e.g. whether an airstrip is clear or obstructed), and/or a configuration of multiple objects detected in the SAR data (e.g. whether a group of vehicles are spaced close together or far apart). The object classification, in some examples, is output as a classification vector that indicates respective probabilities of a plurality of candidate classifications.

In some previous solutions to the challenges discussed above, a machine learning model is used to generate object classifications from SAR range profiles without first converting the SAR range profiles into SAR images. However, in such previous solutions, large amounts of SAR training data are needed to train the machine learning model to accurately classify SAR range profiles. In some examples, SAR range profiles for some types of objects that would be desirable to classify are unavailable. For example, SAR range profiles are unavailable for some types of target objects typically found only in areas that are inaccessible to a user's SAR imaging platforms. In such scenarios, there is insufficient SAR range profile data to train an accurate classifier for such objects using conventional techniques. Thus, such existing machine learning models are often unsuitable for classifying objects for which the training data includes only a small number of range profiles or no range profiles.

Figure 1:
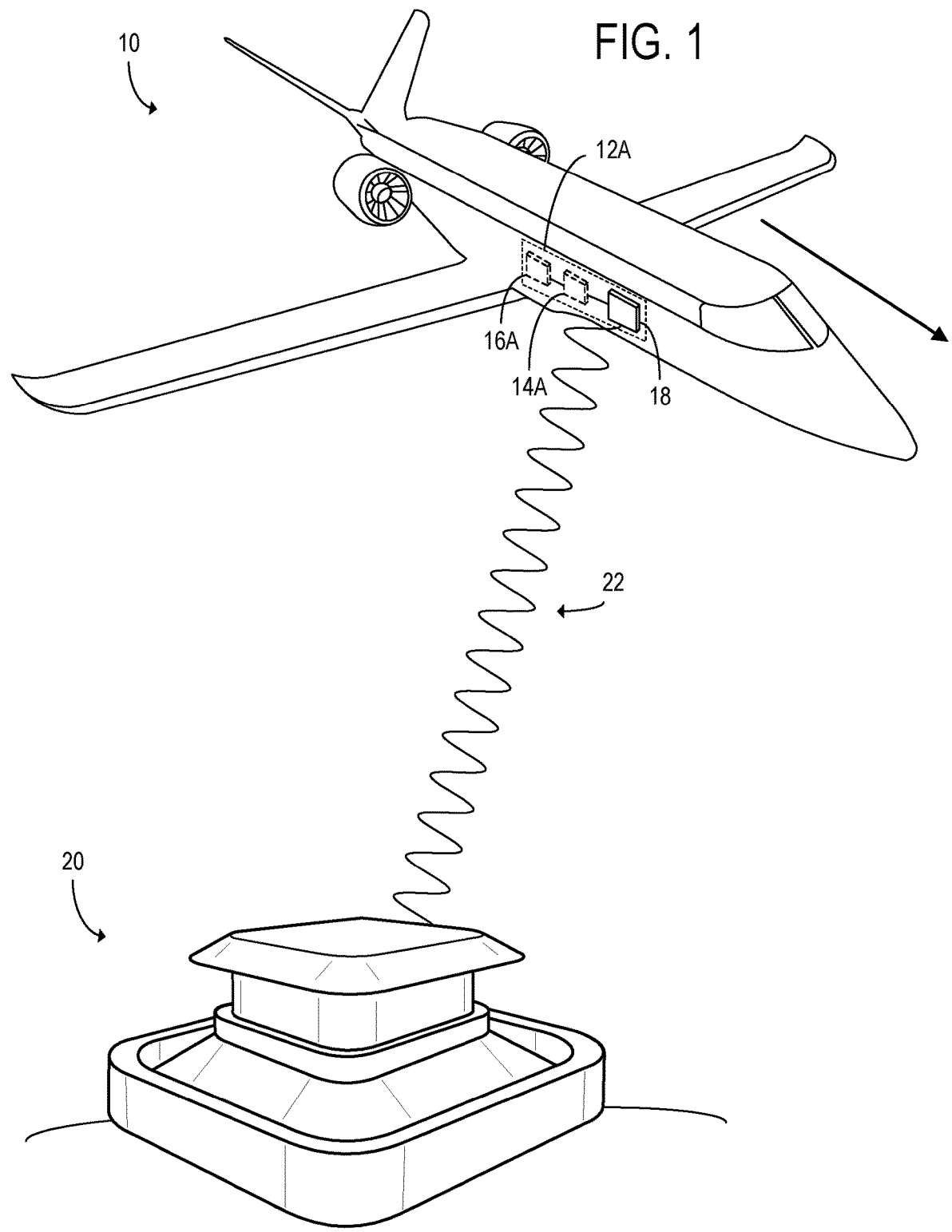
FIG. 1 shows an aircraft including an onboard computing system, according to one example of the present disclosure.

In order to address the above challenges, an aircraft 10 is provided, as shown in the example of FIG. 1. In the example of FIG. 1, an onboard computing system 12A is mounted in the aircraft 10. The aircraft 10 is shown moving past a target object 20 for which the computing system 12 is configured to perform ATR. The target object 20 is a building in the example of FIG. 1. The computing system 12 of the aircraft 10 includes a SAR sensor 18 that is configured to output a radio wave signal 22 and to receive the radio wave signal 22 when the radio wave signal 22 reflects off objects in the environment. The SAR sensor 18 generates a range profile of the environment from the reflected radio wave signal 22.

The onboard computing system 12A of the aircraft 10 further includes an onboard processor 14A and onboard memory 16A. The onboard processor 14A is communicatively coupled to the onboard memory 16A such that the onboard processor 14A is configured to perform computations on data received from the onboard memory 16A. In addition, the onboard processor 14A is configured to store the results of such computations in the onboard memory 16A. The onboard memory 16A, in some examples, includes both volatile memory and non-volatile storage. In some examples, the onboard processor 14A and the onboard memory 16A are provided with a single physical component such as a system-on-a-chip (SoC). Other computing device components such as one or more application-specific integrated circuits (ASICs) or one or more hardware accelerators are also included in the onboard computing system 12A in some examples.

Figure 2:
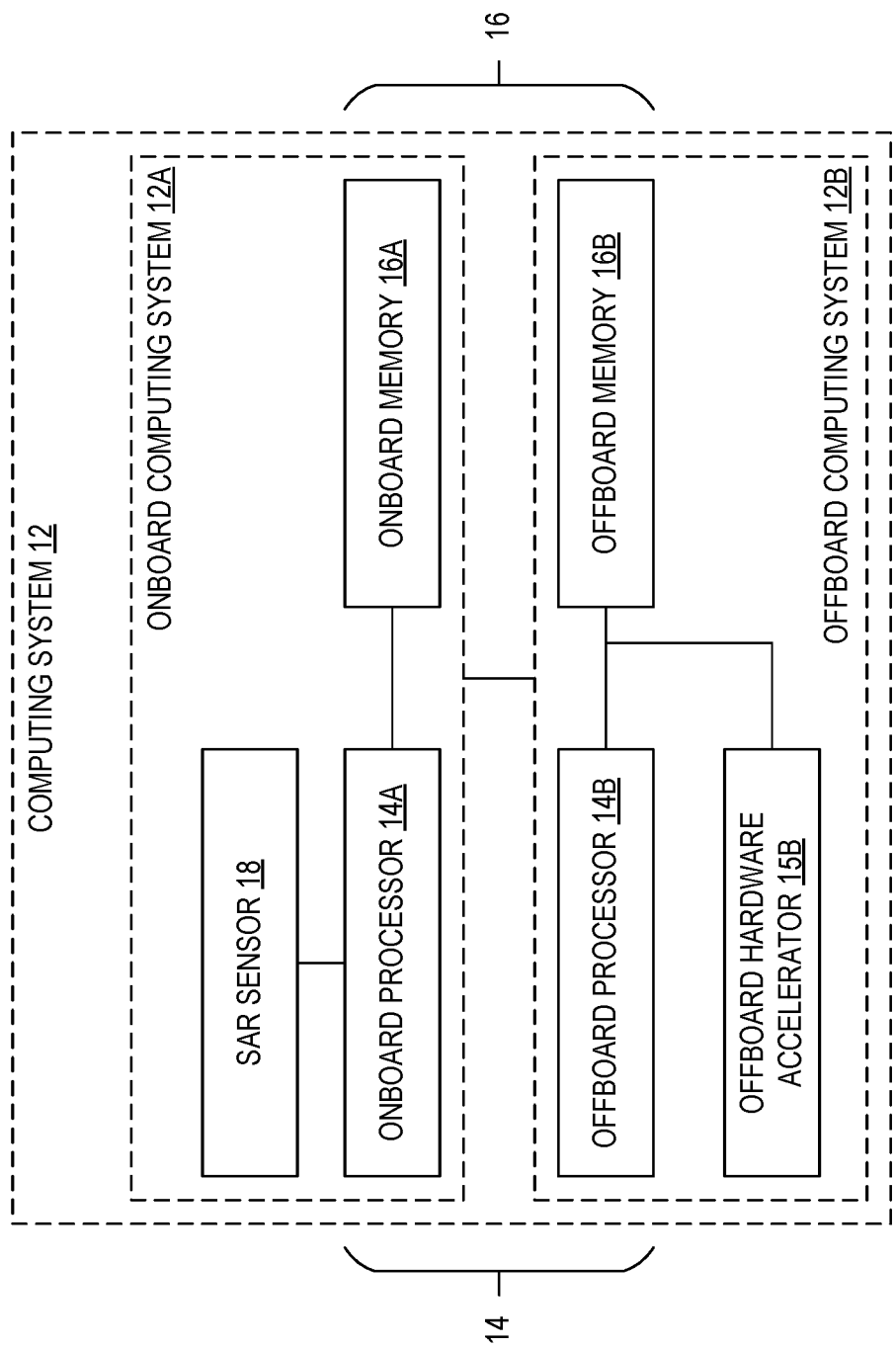
FIG. 2 schematically shows an example computing system including an onboard computing system and an offboard computing system, according to the example of FIG. 1.

FIG. 2 schematically shows an example computing system 12 that includes both the onboard computing system 12A and an offboard computing system 12B. The onboard computing system 12A is communicatively coupled to the offboard computing system 12B such that the onboard computing system 12A is configured to offload some computational tasks to the offboard computing system 12B. The offboard computing system 12B includes an offboard processor 14B communicatively coupled to offboard memory 16B. Thus, the onboard processor 14A and the offboard processor 14B together function as a processor 14 of the computing system 12, and the onboard memory 16A and the offboard memory 16B together function as memory 16 of the computing system 12. In addition, in the example of FIG. 2, the offboard computing system 12B includes an offboard hardware accelerator 15B communicatively coupled to the offboard processor 14B and the offboard memory 16B. In this example, the offboard hardware accelerator 15B is a hardware accelerator specialized for performing computations that are frequently performed when training machine learning models.

In the example of FIG. 2, the computing system 12 is shown at training time, prior to runtime deployment of the aircraft 10 in which the onboard computing system 12A is included. During runtime, the onboard computing system 12A is configured to perform ATR without requiring communication with the offboard computing system 12B.

Figure 3:
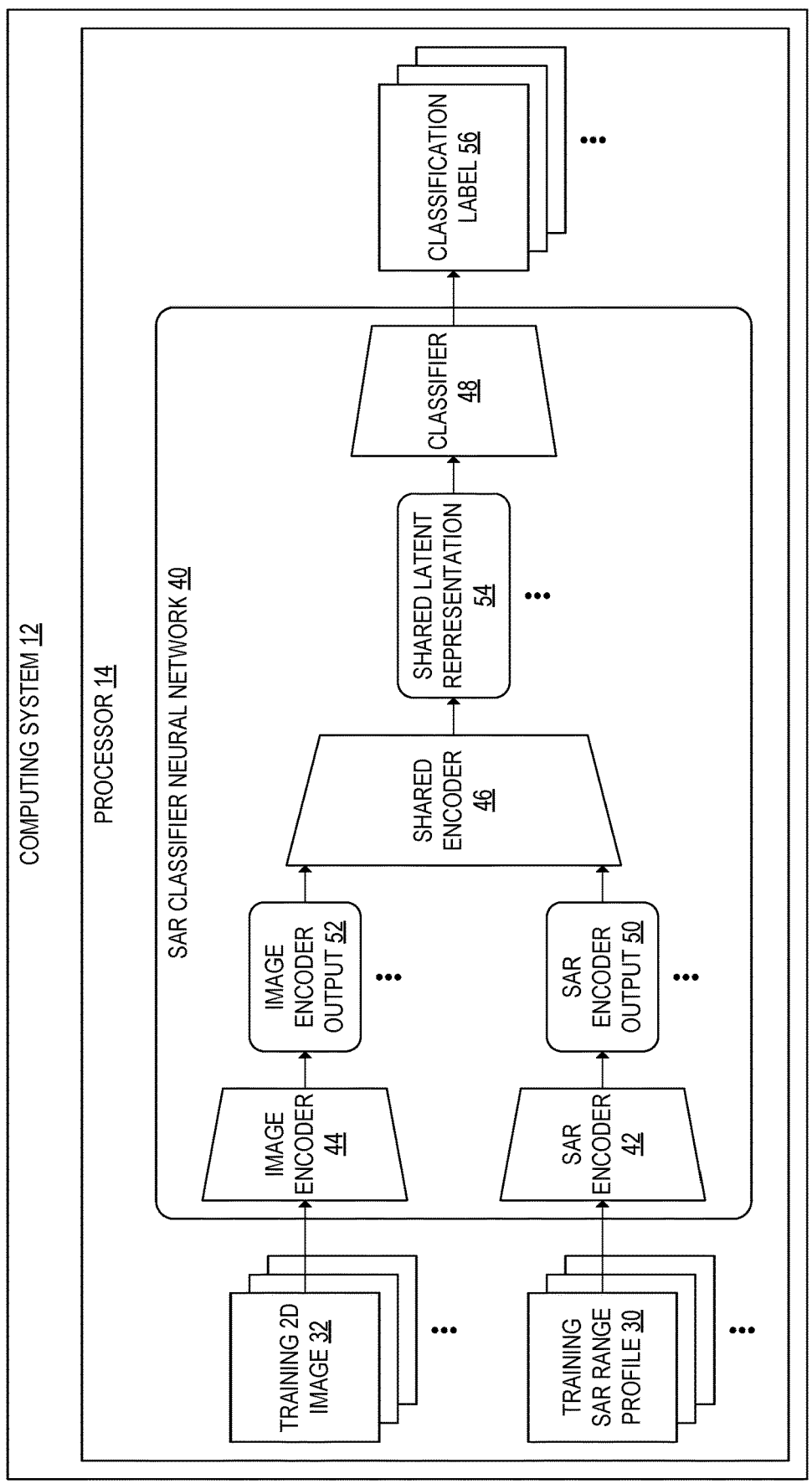
FIG. 3 schematically shows the example computing system of FIG. 2 during training of a SAR classifier neural network.

FIG. 3 schematically shows the example computing system 12 of FIG. 2 when the processor 14 is configured to train a SAR classifier neural network 40. The SAR classifier neural network 40 shown in the example of FIG. 3 includes a SAR encoder 42, an image encoder 44, a shared encoder 46, and a classifier 48. The SAR encoder 42, the image encoder 44, the shared encoder 46, and the classifier 48 are sub-networks of the SAR classifier neural network 40 that are each structured as deep neural networks, as discussed in further detail below. In the example of FIG. 3, the SAR classifier neural network 40 is trained end-to-end.

Figure 4A:
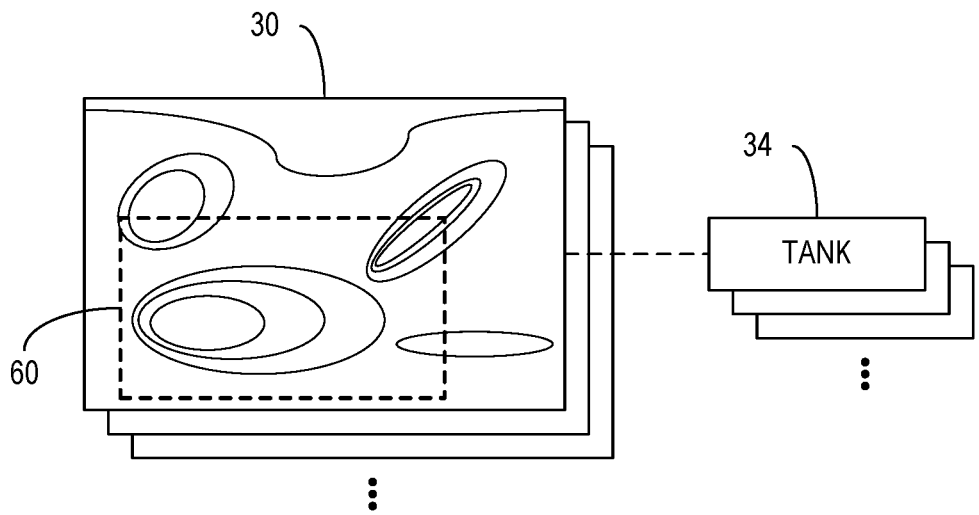
FIG. 4A shows a plurality of training SAR range profiles tagged with a respective plurality of first training labels, according to the example of FIG. 1.

When the processor 14 trains the SAR classifier neural network 40, the processor 14 is configured to receive a plurality of training SAR range profiles 30 at the SAR encoder 42. Each training SAR range profile 30 includes time series data indicating the amplitude and phase of a reflected radio wave signal. In addition, as depicted in the example of FIG. 4A, the plurality of training SAR range profiles 30 are tagged with a respective plurality of first training labels 34. Each of the first training labels 34 in the example of FIG. 4A is a word that identifies an object imaged in the corresponding training SAR range profile 30. In other examples, each first training label 34 instead indicates a condition of an object or a configuration of multiple objects. In some examples in which the plurality of first training labels 34 indicate types of objects, the plurality of first training labels 34 each indicate vehicles. In other examples, the plurality of first training labels 34 each indicate infrastructure or terrain features. Labels indicating other types of detected objects are also contemplated.

Returning to FIG. 3, the processor 14 is configured to receive the plurality of training SAR range profiles 30 at the SAR encoder 42. At the SAR encoder 42, the processor 14 is configured to generate a SAR encoder output 50. In some examples, the SAR encoder output 50 takes the form of a vector of SAR range profile features.

FIG. 5 schematically shows the SAR encoder 42 of FIG. 3 in additional detail, according to one example. In the example of FIG. 5, each training SAR range profile 30 is expressed as a time series of complex-valued vectors that each have a real component 30A and an imaginary component 30B. The SAR encoder 42 includes a first gated recurrent unit (GRU) neural network 42A and a second GRU neural network 42B. The first GRU neural network 42A is configured to receive the real component 30A of the respective training SAR data included in each of the plurality of training SAR range profiles 30. Similarly, the second GRU neural network 42B is configured to receive the imaginary component 30B of the respective training SAR data included in each of the plurality of training SAR range profiles 30. The processor 14 is further configured to combine the respective outputs of the first GRU neural network 42A and the second GRU neural network 42B to compute the SAR encoder output 50. In the example of FIG. 5, the processor 14 is configured to compute the vector elements of the SAR encoder output 50 as $$V_i = \sqrt{R_i^2 + C_i^2}$$

where $R_1$ are vector elements output by the first GRU neural network 42A and $C_1$ are vector elements output by the second GRU neural network 42B.

Figure 4B:
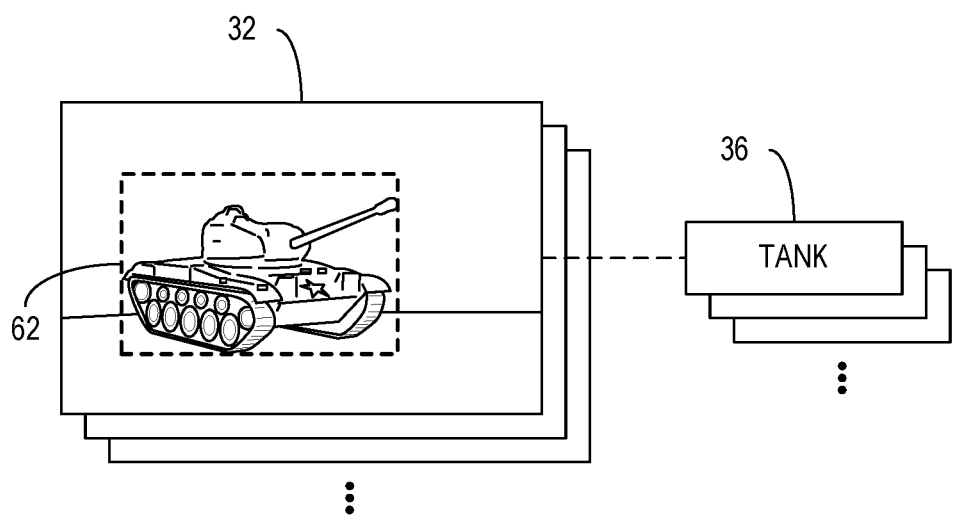
FIG. 4B shows a plurality of training two-dimensional images tagged with a respective plurality of second training labels, according to the example of FIG. 1.

Returning to FIG. 3, the processor 14 is further configured to receive a plurality of training two-dimensional (2D) images 32 at the image encoder 44. In some examples, the training 2D images 32 are images collected by a visible light camera. In other examples, the training 2D images 32 are collected with an infrared depth camera or with some other type of image sensor. As depicted in the example of FIG. 4B, the plurality of training 2D images 32 are tagged with a respective plurality of second training labels 36. In some examples, similarly to the plurality of first training labels 34, the plurality of second training labels 36 each indicate vehicles. In other examples, the plurality of second training labels 36 each indicate infrastructure, terrain features, or some other class of objects. In some examples, the processor 14 is configured to alternate between inputting training SAR range profiles 30 tagged with respective first training labels 34 and inputting training 2D images 32 tagged with respective second training labels 36 into the SAR classifier neural network 40 during training.

In some examples, the plurality of first training labels 34 and the plurality of second training labels 36 have a shared set of unique labels, such that each label that appears in the plurality of first training labels 34 also appears in the plurality of second training labels 36 and each label that appears in the plurality of second training labels 36 also appears in the plurality of first training labels 34. Thus, in such examples, the plurality of training SAR range profiles 30 and the plurality of training 2D images 32 are each matched to training labels drawn from the shared set.

In other examples, the training data for the SAR classifier neural network 40 includes a plurality of training 2D images 32 with respective second training labels 36 that are not also included in the set of first training labels 34. In such examples, the SAR classifier neural network 40 is trained to classify objects for which little to no SAR data is available. Thus, transfer learning from the plurality of training 2D images is instead used to train the SAR classifier neural network 40 such that the SAR classifier neural network 40 is capable of accurately classifying the objects for which large amounts of 2D image data but little to no SAR data is available. Even in examples in which the plurality of second training labels 36 includes one or more labels that are not also included in the plurality of first training labels 34, the set of first training labels 34 has some overlap with the set of second training labels 36 in order to allow transfer learning to be performed. In some examples, a majority of the first training labels 34 are also included in the set of second training labels 36.

In some examples, as shown in FIGS. 4A-4B, the processor 14 is further configured to compute a first region of interest 60 of each training SAR range profile 30 and a second region of interest 62 of each training 2D image 32. In the examples of FIGS. 4A-4B, the first region of interest 60 and the second region of interest 62 are respectively computed for the training SAR range profiles 30 and the training 2D images 32 in a preprocessing phase prior to inputting the training SAR range profiles 30 and the training 2D images 32 into the SAR encoder 42 and the image encoder 44. The processor 14, in such examples, performs a range profile segmentation algorithm on each training SAR range profile 30 and performs an image segmentation algorithm on each training 2D image 32. In some examples in which the processor 14 determines a first region of interest 60 and a second region of interest 62, each first training label 34 of the plurality of first training labels 34 identifies a first object located within the first region of interest 60 of a corresponding training SAR range profile 30 of the plurality of training SAR range profiles 30. In such examples, each second training label 36 of the plurality of second training labels 36 identifies a second object located within the second region of interest 62 of a corresponding training 2D image 32 of the plurality of training 2D images 32.

Returning to FIG. 3, at the image encoder 44, the processor 14 is configured to generate a plurality of image encoder outputs 52. Similarly to the plurality of SAR encoder outputs 50, each image encoder output 52 is, in some examples, a vector of image features. In some examples, the image encoder 44 is a convolutional neural network.

The processor 14 is further configured to receive the plurality of SAR encoder outputs 50 of the SAR encoder 42 and the plurality of image encoder outputs 52 of the image encoder 44 at the shared encoder 46. Based at least in part on the plurality of SAR encoder outputs 50 and the plurality of image encoder outputs 52, the processor 14 is further configured to compute a plurality of shared latent representations 54 at the shared encoder 46. In the example of FIG. 3, the plurality of shared latent representations 54 are expressed as vectors. The shared encoder 46 is a multi-layer perceptron network in the example of FIG. 3.

The processor 14 is further configured to receive the shared latent representations 54 at the classifier 48. Based at least in part on the shared latent representations 54, the processor 14 is further configured to compute a respective plurality of classification labels 56 for the plurality of training SAR range profiles 30 and the plurality of training 2D images 32. The processor 14 is configured to compute a respective classification label 56 for each training SAR range profile 30 and another classification label 56 for each training 2D image 32. In some examples, as depicted in FIG. 6, the classifier 48 is configured to output a probability vector 58 for a plurality of classification labels 56. In such examples, each probability included in the probability vector 58 is a probability that the imaged object, condition, or configuration in the corresponding training SAR range profile 30 or training 2D image 32 is accurately represented by the corresponding classification label 56. The probabilities included in the probability vector 58 sum to one. In some examples, the probability vector 58 include a respective probability for each classification label 56 included in the shared set of unique labels.

Turning now to FIG. 7, the processor 14 is further configured to compute a value of a loss function 70 based at least in part on the plurality of first training labels 34, the plurality of second training labels 36, and the plurality of classification labels 56. In the example of FIG. 7, the loss function 70 includes a SAR classification prediction loss term 72 of the SAR encoder 42. The SAR classification prediction loss term 72 is a measure of prediction error in the classification labels 56 relative to the first training labels 34 associated with the training SAR range profiles 30. In addition, the example loss function 70 of FIG. 7 further includes an image classification prediction loss term 74 of the image encoder 44. The image classification prediction loss term 74 is a measure of prediction error in the classification labels 56 relative to the second training labels 36 associated with the training 2D images 32.

The example loss function 70 of FIG. 7 further includes a domain agnostic loss term 76 of the SAR encoder 42 and the image encoder 44. The domain agnostic loss term 76 is a distance metric between the respective distributions of features output by the SAR encoder 42 and the image encoder 44. In some examples, as discussed in further detail below, the domain agnostic loss term 76 includes a sum of a plurality of Wasserstein distances between a plurality of class conditional distributions of the training SAR range profiles 30 and a corresponding plurality of class conditional distributions of the training 2D images 32. The class conditional distributions, in such examples, are respective distributions of the features output by the shared encoder 46 when training SAR range profiles 30 and training 2D images 32 are received as inputs. The distributions of features output by the shared encoder 46 are distributions over the vector space in which the shared latent representations 54 are encoded. Including the domain agnostic loss term 76 in the loss function 70 allows transfer learning between the SAR encoder 42 and the image encoder 44 to be achieved.

The processor 14 is further configured to perform backpropagation through the classifier 48, the shared encoder 46, the SAR encoder 42, and the image encoder 44 based at least in part on the value of the loss function 70. In the example of FIG. 7, the processor 14 is configured to estimate a minimum value of the loss function 70 via gradient descent. The parameters of the classifier 48, the shared encoder 46, the SAR encoder 42, and the image encoder 44 that are used at runtime are the parameters for which the loss function 70 has the estimated minimum value.

The computation of the loss function 70 is now discussed in additional detail. The set of training SAR range profiles 30 and corresponding first training labels 34 is expressed herein as $$X_D = \{(r_i, c_i, y_i)\}_{i=1}^{N_S}$$

where $r_i \in \mathbb{R}^d$ are the real components 30A of the training SAR range profiles 30, $c_i \in \mathbb{R}^d$ are the imaginary components 30B of the training SAR range profiles 30, $y_i \in \mathbb{R}^K$ are the first training labels 34, and $N_S$ is the number of training SAR range profiles 30. In addition, the set of training 2D images 32 and corresponding second training labels 36 is expressed as $$X_E = \{(x_j', y_j')\}_{j=1}^{N_E}$$

where $x_j' \in \mathbb{R}^e$ are the training 2D images 32, $y_j' \mathbb{R}^K$ are the second training labels 36, and $N_E$ is the number of training 2D images 32. The processor 14 trains the SAR classifier neural network 40 to learn a mapping $f: \mathbb{R}^d \times \mathbb{R}^d \to \mathbb{R}^K$ that predicts classification labels 56 from the real and imaginary components $r_j, c_j \in \mathbb{R}^d$ of SAR range profiles.

The SAR classifier neural network 40 is trained by estimating the following quantity:

$$\arg\min_{h, \varphi, \psi_S, \psi_E} L_{pred}^S + \mu L_{pred}^E + \lambda L_W$$

In the above expression, $L_{pred}^S$ is the SAR classification prediction loss term 72, $\mu L_{pred}^E$ is the image classification prediction loss term 74, and $\lambda L_W$ is the domain agnostic loss term 76. $\mu$ and $\lambda$ are weighting coefficients of terms of the loss function 70. The classifier 48 is expressed as $h: \mathbb{R}^n \to \mathbb{R}^K$, the shared encoder 46 is expressed as $\varphi: \mathbb{R}^N \to \mathbb{R}^m$, the SAR encoder 42 is expressed as $h: \mathbb{R}^n \to \mathbb{R}^K$, and the image encoder 44 is expressed as $\psi_E: \mathbb{R}^e \to \mathbb{R}^n$. The SAR classification prediction loss term 72 and the image classification prediction loss term 74 are given by the following:

$$L_{pred}^S = \frac{1}{N_S} \sum_{i=1}^{N_S} d(h(\varphi(\psi_S(r_i, c_i))), y_i)$$

$$L_{pred}^E = \frac{1}{N_E} \sum_{i=1}^{N_E} d(h(\varphi(\psi_E(x_j'))), y_j)$$

In the above equations, $d(\cdot, \cdot)$ is a distance between the classification labels 56 and the training labels.

As discussed above, the domain agnostic loss term 76 is computed at least in part by summing a plurality of Wasserstein distances. The domain agnostic loss term 76 is given by the following:

$$L_W = \Sigma_k W_2^2(p_\varphi(\cdot|k), q_\varphi(\cdot|k))$$

In the above equation, $p_\varphi(\cdot|k)$ is the class conditional distribution of a training SAR range profile 30 and is given by the following:

$$p_\varphi(x|k) = \frac{1}{|C_k|} \sum_{\{i | x_i \in C_k\}} \delta(x - x_i)$$

In the above equation, $C_k$ is the set of SAR images $x_i$ that belongs to the SAR class k. In addition, $q_\varphi(x|k)$ is the class conditional distribution of a training 2D image 32. $q_\varphi(x|k)$ is defined as follows:

$$q_\varphi(x|k) = \frac{1}{|C_k|} \sum_{\{i | x_i' \in C_k\}} \delta(x - x_i')$$

In the equation for the domain agnostic loss term 76 shown above, $W_2^2(\cdot, \cdot)$ denotes the 2-Wasserstein distance. The 2-Wasserstein distance is computed as a solution to the following linear programming problem:

$$W_2^2(p_\varphi, q_\varphi) = \min_\pi \sum_{i,j} \|\varphi(x_i) - \varphi(x_j')\|^2 \pi_{ij}$$

The above equation is subject to the following conditions:

$$\pi_{ij} \geq 0$$

$$\sum_j^{N_E} \pi_{ij} = \frac{1}{N_S}$$

$$\sum_j^{N_S} \pi_{ij} = \frac{1}{N_E}$$

The processor 14 is configured to estimate the 2-Wasserstein distance numerically according to the above equation for $W_2^2$. In some examples, the processor 14 is configured to numerically estimate the 2-Wasserstein distance using an entropic regularized version of the above equation. Thus, the processor 14 is configured to estimate the 2-Wasserstein distances that are summed when $L_W$ is computed.

Figure 8:
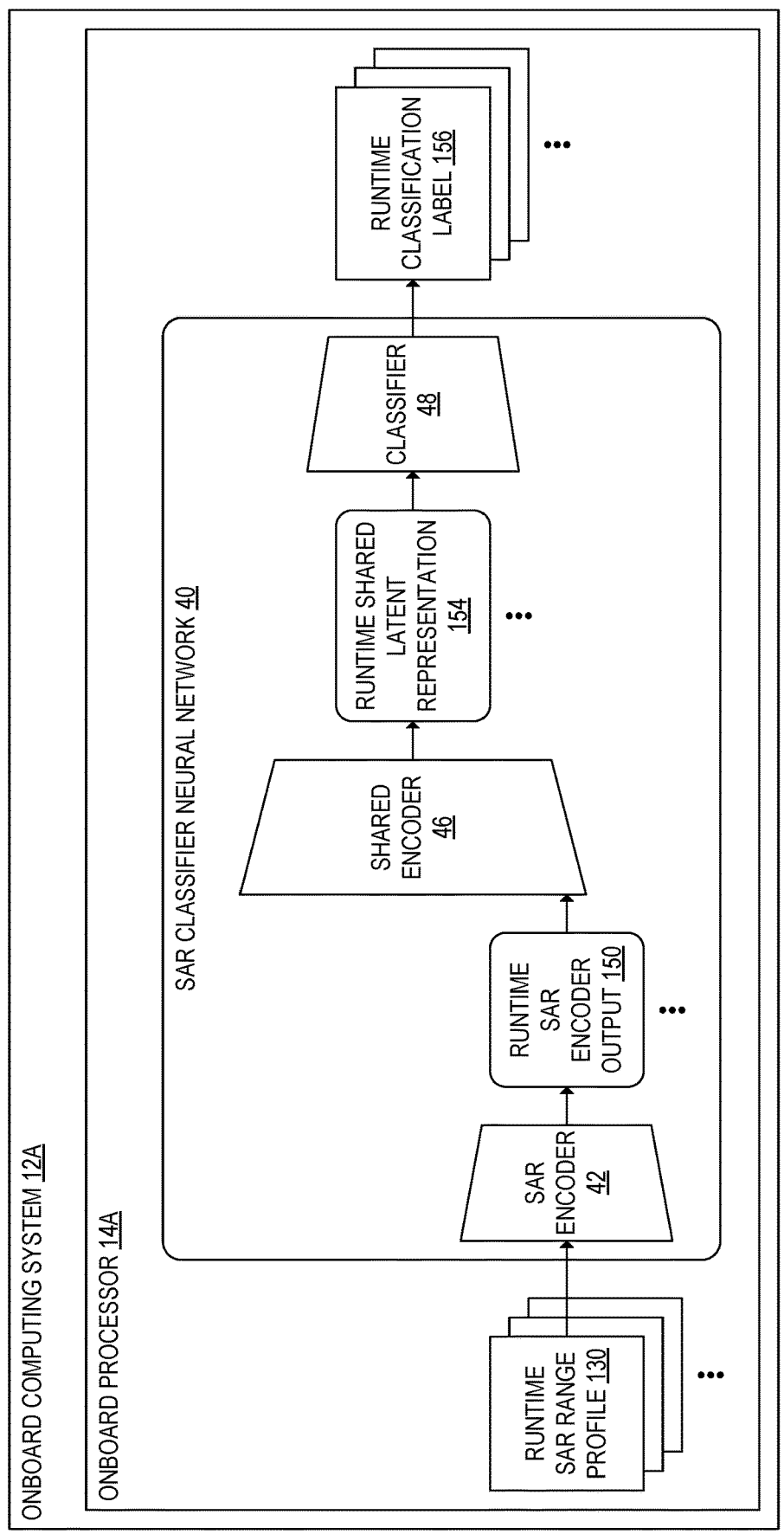
FIG. 8 schematically shows the SAR classifier neural network when a runtime classification label is generated for a runtime SAR range profile, according to the example of FIG. 3.

FIG. 8 shows the SAR classifier neural network 40 at runtime subsequent to training of the SAR classifier neural network 40. In the example of FIG. 8, the SAR classifier neural network 40 is executed by the onboard processor 14A included in the onboard computing system 12A of the aircraft 10. As shown in the example of FIG. 8, the onboard processor 14A is configured to receive a runtime SAR range profile 130 from the SAR sensor 18. The onboard processor 14A is further configured to generate a runtime classification label 156 associated with the runtime SAR range profile 130 at the SAR classifier neural network 40.

During runtime, the SAR classifier neural network 40 depicted in the example of FIG. 8 is configured to receive a runtime SAR range profile 130 without receiving one or more 2D images. Thus, the onboard processor 14A is configured to classify SAR data at runtime without requiring sensed objects to also be imaged using other sensing modalities. At the SAR encoder 42, the onboard processor 14A is further configured to generate a runtime SAR encoder output 150, which is received at the shared encoder 46. At the shared encoder 46, the onboard processor 14A is further configured to generate a runtime shared latent representation 154 based at least in part on the runtime SAR encoder output 150. At the classifier 48, the onboard processor 14A is further configured to receive the runtime shared latent representation 154 and output the runtime classification label 156 for the runtime SAR range profile 130.

Figure 9:
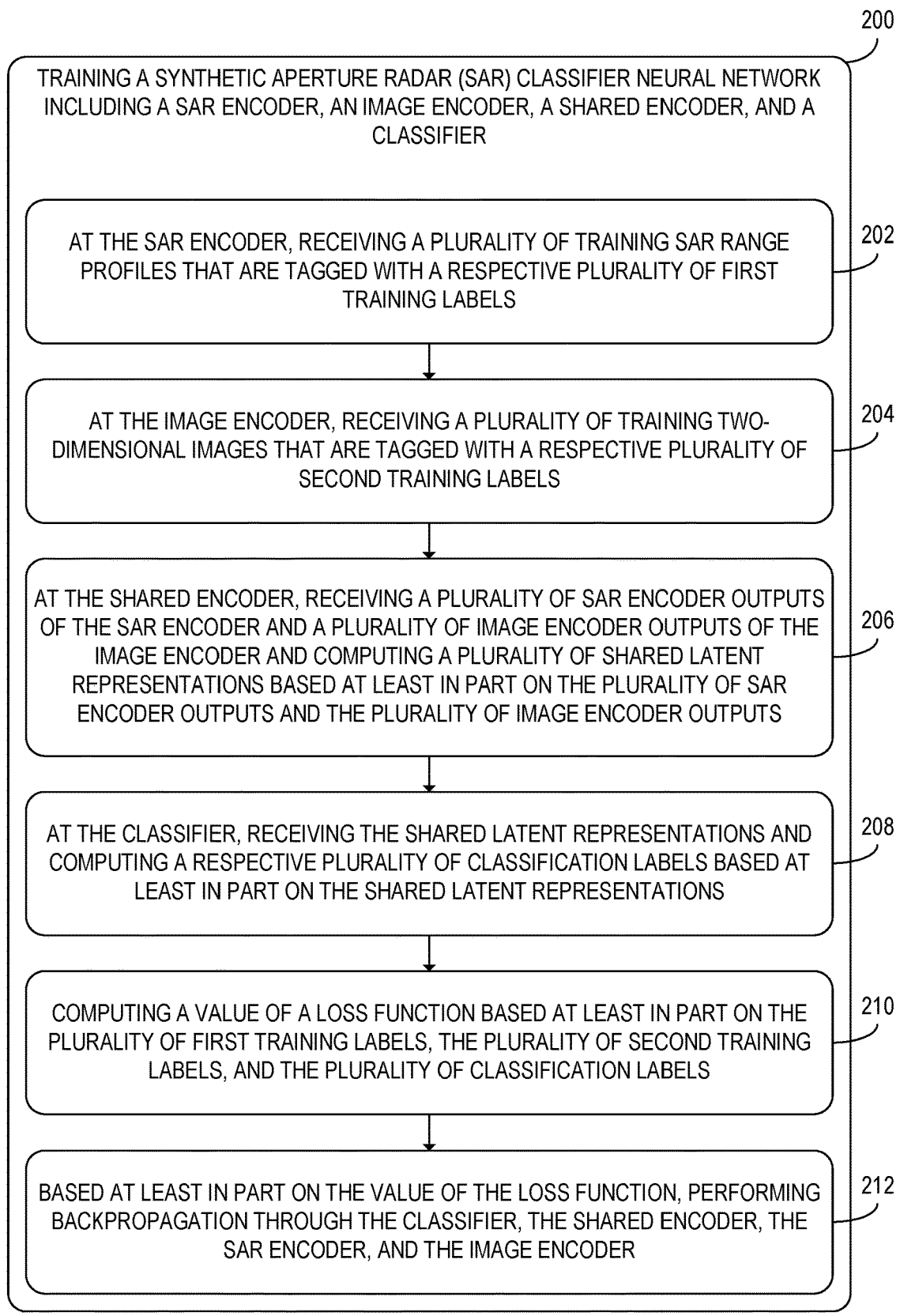
FIG. 9 shows a flowchart of a method for use with a computing system when training a SAR classifier neural network, according to the example of FIG. 1.

FIG. 9 shows a flowchart of a method 200 for use with a computing system, such as, for example, the computing system 12 of FIG. 2. The method 200 is a method of training a SAR classifier neural network including a SAR encoder, an image encoder, a shared encoder, and a classifier. Training the SAR classifier neural network includes, at step 202, receiving a plurality of training SAR range profiles that are tagged with a respective plurality of first training labels. The plurality of training SAR range profiles are received at the SAR encoder. The training SAR range profiles each include complex-valued time series data collected by a SAR sensor. In some examples, the SAR encoder includes a first GRU neural network configured to receive a real component of the respective training SAR data included in each of the plurality of training SAR range profiles. In such examples, the SAR encoder further includes a second GRU neural network configured to receive an imaginary component of the respective training SAR data included in each of the plurality of training SAR range profiles.

At step 204, the method 200 further includes receiving a plurality of training 2D images that are tagged with a respective plurality of second training labels. The plurality of training 2D images are received at the image encoder. The training 2D images are each collected using a visible light camera, an infrared depth camera, or some other type of imaging sensor. In some examples, the image encoder is a convolutional neural network.

In some examples, each first training label of the plurality of first training labels identifies a first object located within a first region of interest of a corresponding training SAR range profile of the plurality of training SAR range profiles. The first region of interest is identified in such examples by performing a range profile segmentation algorithm on the training SAR range profiles prior to inputting the training SAR range profiles into the SAR encoder. In addition, in such examples, each second training label of the plurality of second training labels identifies a second object located within a second region of interest of a corresponding training 2D image of the plurality of training 2D images. The second region of interest is identified by performing an image segmentation algorithm on the training 2D images prior to inputting the training 2D images into the image encoder.

In some examples, the plurality of first training labels and the plurality of second training labels each indicate vehicles, infrastructure, or terrain features. Additionally or alternatively, in some examples, the plurality of first training labels and the plurality of second training labels have a shared set of unique labels. In other examples, the plurality of second training labels includes one or more labels that are not included in the plurality of first training labels. Thus, in such examples, the SAR classifier neural network is trained to classify one or more objects for which 2D image data but not SAR data is included in the training data.

At step 206, the method 200 further includes, at the shared encoder, receiving a plurality of SAR encoder outputs of the SAR encoder and a plurality of image encoder outputs of the image encoder and computing a plurality of shared latent representations based at least in part on the plurality of SAR encoder outputs and the plurality of image encoder outputs.

In examples in which the SAR encoder includes a first GRU neural network and a second GRU neural network, the SAR encoder outputs are computed as vectors of elementwise distances between respective output vectors of the first GRU neural network and the second GRU neural network. In some examples, the shared encoder is a multi-layer perceptron network.

At step 208, the method 200 further includes receiving the shared latent representations at the classifier and computing a respective plurality of classification labels based at least in part on the shared latent representations. In some examples in which the plurality of first classification labels and the plurality of second classification labels have a shared set of unique labels, the plurality of classification labels are included in the shared set of unique labels. In some examples, the classifier outputs a vector of probabilities associated with each of a plurality of candidate labels.

At step 210, the method 200 further includes computing a value of a loss function based at least in part on the plurality of first training labels, the plurality of second training labels, and the plurality of classification labels. According to one example, the loss function includes a SAR classification prediction loss term of the SAR encoder, an image classification prediction loss term of the image encoder, and a domain agnostic loss term of the SAR encoder and the image encoder. Accordingly, the loss function penalizes the SAR classifier neural network for incorrectly classifying training SAR range profiles, incorrectly classifying training images, and having different distributions in the vector space of the shared latent representations for SAR range profiles and for 2D images.

At step 212, the method 200 further includes performing backpropagation through the classifier, the shared encoder, the SAR encoder, and the image encoder based at least in part on the value of the loss function. When backpropagation through the classifier, the shared encoder, the SAR encoder, and the image encoder is performed, a minimum value of the loss function is estimated via gradient descent. The parameter values of the classifier, the shared encoder, the SAR encoder, and the image encoder when the loss function has the estimated minimum value are the parameter values that are used to perform inferencing at runtime.

Figure 10:
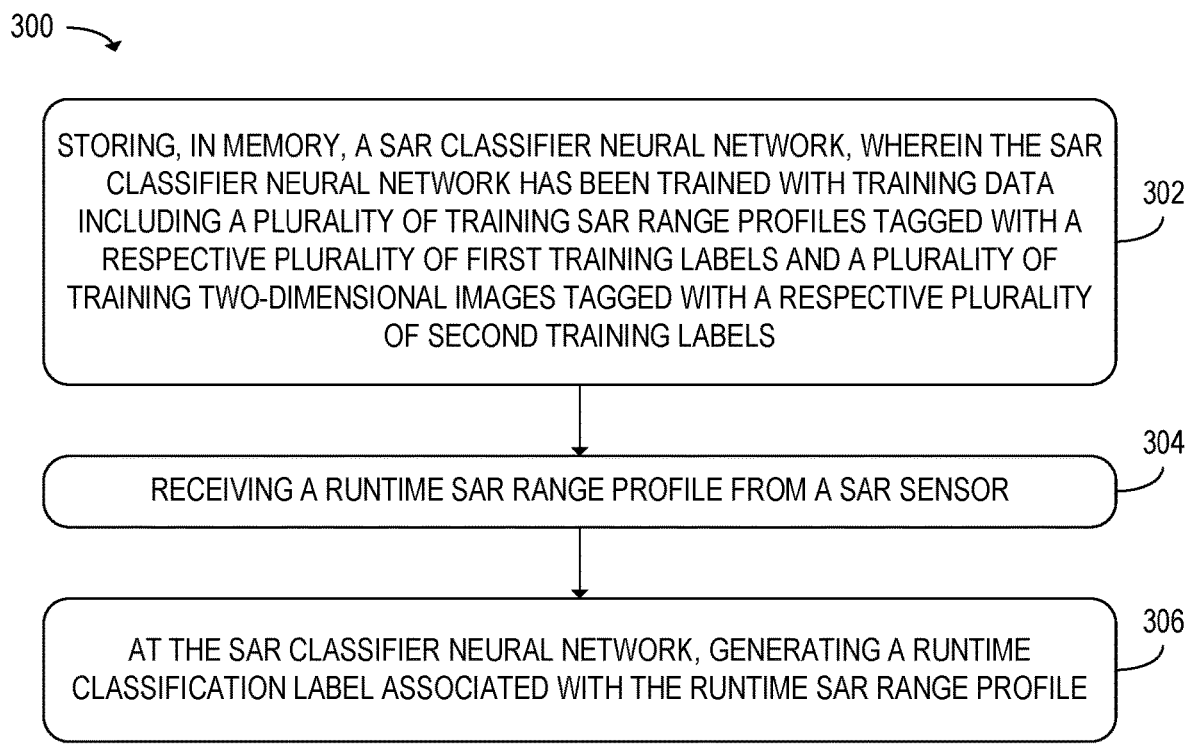
FIG. 10 shows a flowchart of a method for use with a computing system to generate a runtime classification label for a runtime SAR range profile, according to the example of FIG. 1.

FIG. 10 shows a flowchart of a method 300 for use with a computing system to classify SAR data. At step 302, the method 300 includes storing, in memory included in the computing system, a SAR classifier neural network. The SAR classifier neural network has been trained with training data including a plurality of training SAR range profiles tagged with a respective plurality of first training labels. The training data further includes a plurality of training 2D images tagged with a respective plurality of second training labels. In one example, the computing system is an onboard computing system of a vehicle that is communicatively coupled to an offboard computing system. In this example, the SAR classifier neural network is trained at the offboard computing system and is subsequently loaded into the memory of the onboard computing system.

At step 304, the method 300 further includes receiving a runtime SAR range profile from a SAR sensor. The SAR sensor is included in the onboard computing system in examples in which the method 300 is performed at an onboard computing system as discussed above.

At step 306, the method 300 further includes generating, at the SAR classifier neural network, a runtime classification label associated with the runtime SAR range profile. In some examples, step 306 includes generating a vector of probabilities respectively associated with a plurality of candidate runtime classification labels.

According to one example use case scenario, the SAR classifier neural network is implemented at an onboard computing system of an unmanned aerial vehicle (UAV) that is configured to perform ATR at least in part by using the SAR classifier neural network to classify objects detected in SAR range profiles. In this example, the SAR classifier neural network is configured to identify military vehicles and to distinguish military vehicles from civilian vehicles. For some of the types of military vehicles that the SAR classifier neural network is configured to identify, training SAR range profiles were not available during training of the SAR classifier neural network. Instead, transfer learning from 2D images of such military vehicles is used to train the SAR classifier neural network to identify those military vehicles from SAR range profiles.

According to another example use case scenario, the SAR classifier neural network is implemented at an onboard computing system of a package delivery UAV. The SAR classifier neural network, in this example, is configured to identify infrastructure and terrain features that are suitable delivery points for packages. The package delivery UAV is configured to carry multiple different types of packages that have different delivery site criteria. In some examples, the delivery site criteria differ depending upon the size, shape, and fragility level of the package. For example, when a small package is delivered, the package delivery UAV has eligible delivery sites that would not be eligible when a large package is delivered. Thus, the memory included in the onboard computing system stores a plurality of SAR classifier neural networks corresponding to a plurality of package types. At the beginning of a delivery mission, a user selects a SAR classifier neural network of the plurality of SAR classifier neural networks that corresponds to the type of package that is configured to be delivered. During the delivery mission, the package delivery UAV is configured to select a delivery location for the package at least in part by collecting a SAR range profile of the delivery location and classifying the delivery location as eligible using the selected SAR classifier neural network.

Using the systems and methods discussed above, objects are classified based on SAR range profiles without having to convert those SAR range profiles into SAR images. Thus, the above systems and methods make onboard SAR range profile classification feasible for lightweight aircraft with limited computing capabilities. In addition, by utilizing transfer learning, the systems and methods discussed above allow the SAR classifier neural network to be trained to classify SAR profiles of classes of objects for which there would otherwise be insufficient SAR training data to train a classifier model. Thus, the above systems and methods allow ATR systems to be more easily updated to account for newly introduced classes of objects.

Figure 11:
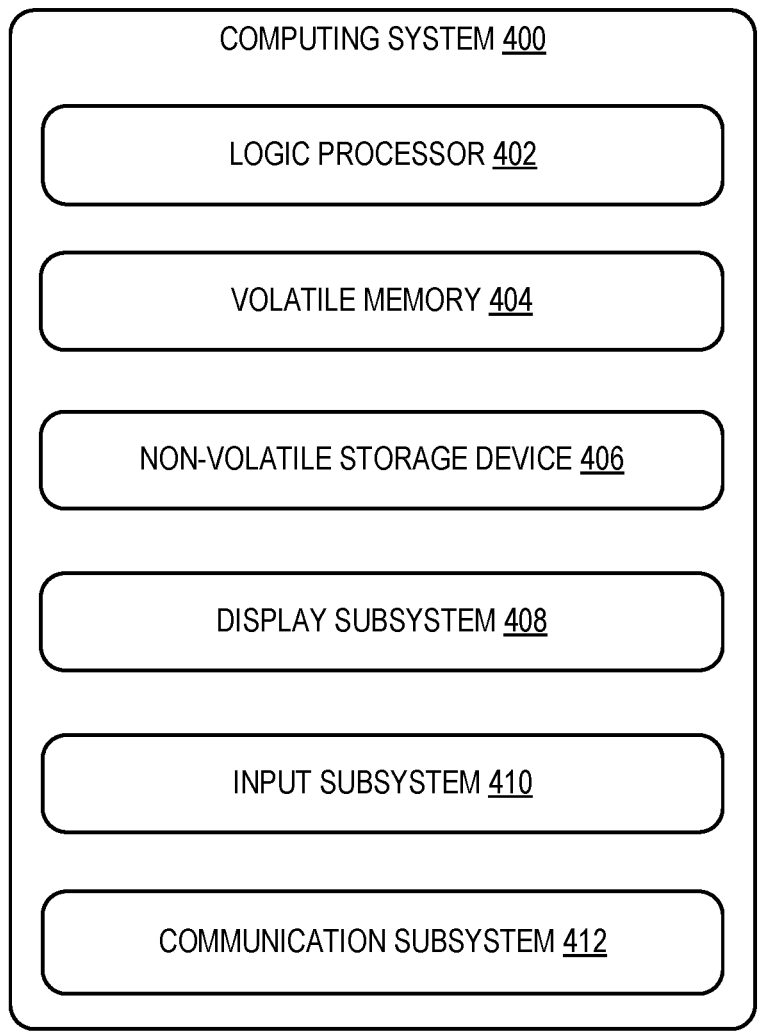
FIG. 11 schematically shows an exemplary computing system that can be used to implement the SAR classifier neural network of FIG. 3.

FIG. 11 illustrates an exemplary computing system 400 that can be utilized to implement the computing system 12 and the methods 200 and 300 described above. Computing system 400 includes a logic processor 402, volatile memory 404, and a non-volatile storage device 406. Computing system 400 can optionally include a display subsystem 408, input subsystem 410, communication subsystem 412 connected to a computer network, and/or other components not shown in FIG. 11. These components are typically connected for data exchange by one or more data buses when integrated into single device, or by a combination of data buses, network data interfaces, and computer networks when integrated into separate devices connected by computer networks.

The non-volatile storage device 406 stores various instructions, also referred to as software, that are executed by the logic processor 402. Logic processor 402 includes one or more physical devices configured to execute the instructions. For example, the logic processor 402 can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 402 can include one or more physical processors (hardware) configured to execute software instructions. Additionally or alternatively, the logic processor 402 can include one or more hardware logic circuits or firmware devices configured to execute hardware-implemented logic or firmware instructions. Processors of the logic processor 402 can be single-core or multi-core, and the instructions executed thereon can be configured for sequential, parallel, and/or distributed processing. Individual components of the logic processor 402 optionally can be distributed among two or more separate devices, which can be remotely located and/or configured for coordinated processing. Aspects of the logic processor 402 can be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 can be transformed—e.g., to hold different data.

Non-volatile storage device 406 can include physical devices that are removable and/or built-in. Non-volatile storage device 406 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 can include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 can include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of the computing system 12 typically implemented in software by a processor to perform a particular function using portions of volatile memory, which function involves transformative processing that specially configures the processor to perform the function. Thus, a module, program, or engine can be instantiated via logic processor 402 executing instructions held by non-volatile storage device 406, using portions of volatile memory 404. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

Display subsystem 408 typically includes one or more displays, which can be physically integrated with or remote from a device that houses the logic processor 402. Graphical output of the logic processor executing the instructions described above, such as a graphical user interface, is configured to be displayed on display subsystem 408.

Input subsystem 410 typically includes one or more of a keyboard, pointing device (e.g., mouse, trackpad, finger operated pointer), touchscreen, microphone, and camera. Other input devices can also be provided.

Communication subsystem 412 is configured to communicatively couple various computing devices described herein with each other, and with other devices. Communication subsystem 412 can include wired and/or wireless communication devices compatible with one or more different communication protocols. As non-limiting examples, the communication subsystem can be configured for communication via a wireless telephone network, or a wired or wireless local- or wide-area network by devices such as a 3G, 4G, 5G, or 6G radio, WIFI card, ethernet network interface card, BLUETOOTH radio, etc. In some embodiments, the communication subsystem can allow computing system 400 to send and/or receive messages to and/or from other devices via a network such as the Internet. It will be appreciated that one or more of the computer networks via which communication subsystem 412 is configured to communicate can include security measures such as user identification and authentication, access control, malware detection, enforced encryption, content filtering, etc., and can be coupled to a wide area network (WAN) such as the Internet.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein can define patentable subject matter apart from the disclosed examples and can find utility in other implementations not expressly disclosed herein.

"And/or" as used herein is defined as the inclusive or ∨, as specified by the following truth table:

| A | B | A ∨ B |
|---|---|---|
| True | True | True |
| True | False | True |
| False | True | True |
| False | False | False |

Further, the disclosure comprises configurations according to the following clauses.

Clause 1. A computing system comprising: a processor configured to train a synthetic aperture radar (SAR) classifier neural network, wherein the SAR classifier neural network includes a SAR encoder, an image encoder, a shared encoder, and a classifier that are trained at least in part by: at the SAR encoder, receiving a plurality of training SAR range profiles that are tagged with a respective plurality of first training labels; at the image encoder, receiving a plurality of training two-dimensional images that are tagged with a respective plurality of second training labels; at the shared encoder, receiving a plurality of SAR encoder outputs of the SAR encoder and a plurality of image encoder outputs of the image encoder and computing a plurality of shared latent representations based at least in part on the plurality of SAR encoder outputs and the plurality of image encoder outputs; at the classifier, receiving the shared latent representations and computing a respective plurality of classification labels based at least in part on the shared latent representations; computing a value of a loss function based at least in part on the plurality of first training labels, the plurality of second training labels, and the plurality of classification labels; and based at least in part on the value of the loss function, performing backpropagation through the classifier, the shared encoder, the SAR encoder, and the image encoder.

Clause 2. The computing system of clause 1, wherein the SAR encoder includes: a first gated recurrent unit (GRU) neural network configured to receive a real component of respective training SAR data included in each of the plurality of training SAR range profiles; and a second GRU neural network configured to receive an imaginary component of the respective training SAR data included in each of the plurality of training SAR range profiles.

Clause 3. The computing system of clause 1 or 2, wherein the image encoder is a convolutional neural network.

Clause 4. The computing system of any of clauses 1 to 3, wherein the shared encoder is a multi-layer perceptron network.

Clause 5. The computing system of any of clauses 1 to 4, wherein the loss function includes: a SAR classification prediction loss term of the SAR encoder; an image classification prediction loss term of the image encoder; and a domain agnostic loss term of the SAR encoder and the image encoder.

Clause 6. The computing system of any of clauses 1 to 5, wherein the domain agnostic loss term includes a sum of a plurality of Wasserstein distances between a plurality of class conditional distributions of the training SAR range profiles and a corresponding plurality of class conditional distributions of the training two-dimensional images.

Clause 7. The computing system of any of clauses 1 to 6, wherein the plurality of first training labels and the plurality of second training labels have a shared set of unique labels.

Clause 8. The computing system of any of clauses 1 to 7, wherein the plurality of first training labels and the plurality of second training labels each indicate vehicles.

Clause 9. The computing system of any of clauses 1 to 8, wherein the plurality of first training labels and the plurality of second training labels each indicate infrastructure or terrain features.

Clause 10. The computing system of any of clauses 1 to 9, wherein: each first training label of the plurality of first training labels identifies a first object located within a first region of interest of a corresponding training SAR range profile of the plurality of training SAR range profiles; and each second training label of the plurality of second training labels identifies a second object located within a second region of interest of a corresponding training two-dimensional image of the plurality of training two-dimensional images.

Clause 11. A method for use with a computing system, the method comprising: training a synthetic aperture radar (SAR) classifier neural network including a SAR encoder, an image encoder, a shared encoder, and a classifier, wherein training the SAR classifier neural network includes: at the SAR encoder, receiving a plurality of training SAR range profiles that are tagged with a respective plurality of first training labels; at the image encoder, receiving a plurality of training two-dimensional images that are tagged with a respective plurality of second training labels; at the shared encoder, receiving a plurality of SAR encoder outputs of the SAR encoder and a plurality of image encoder outputs of the image encoder and computing a plurality of shared latent representations based at least in part on the plurality of SAR encoder outputs and the plurality of image encoder outputs; at the classifier, receiving the shared latent representations and computing a respective plurality of classification labels based at least in part on the shared latent representations; computing a value of a loss function based at least in part on the plurality of first training labels, the plurality of second training labels, and the plurality of classification labels; and based at least in part on the value of the loss function, performing backpropagation through the classifier, the shared encoder, the SAR encoder, and the image encoder.

Clause 12. The method of clause 11, wherein the SAR encoder includes: a first gated recurrent unit (GRU) neural network configured to receive a real component of respective training SAR data included in each of the plurality of training SAR range profiles; and a second GRU neural network configured to receive an imaginary component of the respective training SAR data included in each of the plurality of training SAR range profiles.

Clause 13. The method of clause 11 or 12, wherein the image encoder is a convolutional neural network.

Clause 14. The method of any of clauses 11 to 13, wherein the shared encoder is a multi-layer perceptron network.

Clause 15. The method of any of clauses 11 to 14, wherein the loss function includes: a SAR classification prediction loss term of the SAR encoder; an image classification prediction loss term of the image encoder; and a domain agnostic loss term of the SAR encoder and the image encoder.

Clause 16. The method of any of clauses 11 to 15, wherein the domain agnostic loss term includes a sum of a plurality of Wasserstein distances between a plurality of class conditional distributions of the training SAR range profiles and a corresponding plurality of class conditional distributions of the training two-dimensional images.

Clause 17. The method of any of clauses 11 to 16, wherein the plurality of first training labels and the plurality of second training labels each indicate vehicles, infrastructure, or terrain features.

Clause 18. The method of any of clauses 11 to 17, wherein: each first training label of the plurality of first training labels identifies a first object located within a first region of interest of a corresponding training SAR range profile of the plurality of training SAR range profiles; and each second training label of the plurality of second training labels identifies a second object located within a second region of interest of a corresponding training two-dimensional image of the plurality of training two-dimensional images.

Clause 19. A computing system comprising: a synthetic aperture radar (SAR) sensor; memory storing a SAR classifier neural network, wherein the SAR classifier neural network has been trained with training data including: a plurality of training SAR range profiles tagged with a respective plurality of first training labels; and a plurality of training two-dimensional images tagged with a respective plurality of second training labels; and a processor configured to: receive a runtime SAR range profile from the SAR sensor; and at the SAR classifier neural network, generate a runtime classification label associated with the runtime SAR range profile.

Clause 20. The computing system of clause 19, wherein the SAR sensor, the memory, and the processor are mounted in an aircraft.

The invention claimed is:

1. A computing system comprising:
a processor configured to train a synthetic aperture radar (SAR) classifier neural network, wherein the SAR classifier neural network includes a SAR encoder, an image encoder, a shared encoder, and a classifier that are trained at least in part by:
at the SAR encoder, receiving a plurality of training SAR range profiles that are tagged with a respective plurality of first training labels;
at the image encoder, receiving a plurality of training two-dimensional images that are tagged with a respective plurality of second training labels;
at the shared encoder, receiving a plurality of SAR encoder outputs of the SAR encoder and a plurality of image encoder outputs of the image encoder and computing a plurality of shared latent representations based at least in part on the plurality of SAR encoder outputs and the plurality of image encoder outputs;
at the classifier, receiving the shared latent representations and computing a respective plurality of classification labels based at least in part on the shared latent representations;
computing a value of a loss function based at least in part on the plurality of first training labels, the plurality of second training labels, and the plurality of classification labels; and
based at least in part on the value of the loss function, performing backpropagation through the classifier, the shared encoder, the SAR encoder, and the image encoder.

2. The computing system of claim 1, wherein the SAR encoder includes:
a first gated recurrent unit (GRU) neural network configured to receive a real component of respective training SAR data included in each of the plurality of training SAR range profiles; and
a second GRU neural network configured to receive an imaginary component of the respective training SAR data included in each of the plurality of training SAR range profiles.

3. The computing system of claim 2, wherein the processor is configured to compute the SAR encoder outputs as vectors of elementwise distances between respective output vectors of the first GRU neural network and the second GRU neural network.

4. The computing system of claim 1, wherein the image encoder is a convolutional neural network.

5. The computing system of claim 1, wherein the shared encoder is a multi-layer perceptron network.

6. The computing system of claim 1, wherein the loss function includes:
- a SAR classification prediction loss term of the SAR encoder;
- an image classification prediction loss term of the image encoder; and
- a domain agnostic loss term of the SAR encoder and the image encoder.

7. The computing system of claim 6, wherein the domain agnostic loss term includes a sum of a plurality of Wasserstein distances between a plurality of class conditional distributions of the training SAR range profiles and a corresponding plurality of class conditional distributions of the training two-dimensional images.

8. The computing system of claim 1, wherein the plurality of first training labels and the plurality of second training labels have a shared set of unique labels.

9. The computing system of claim 1, wherein the plurality of first training labels and the plurality of second training labels each indicate vehicles.

10. The computing system of claim 1, wherein the plurality of first training labels and the plurality of second training labels each indicate infrastructure or terrain features.

11. The computing system of claim 1, wherein:
- each first training label of the plurality of first training labels identifies a first object located within a first region of interest of a corresponding training SAR range profile of the plurality of training SAR range profiles; and
- each second training label of the plurality of second training labels identifies a second object located within a second region of interest of a corresponding training two-dimensional image of the plurality of training two-dimensional images.

12. A method for use with a computing system, the method comprising:
- training a synthetic aperture radar (SAR) classifier neural network including a SAR encoder, an image encoder, a shared encoder, and a classifier, wherein training the SAR classifier neural network includes:
  - at the SAR encoder, receiving a plurality of training SAR range profiles that are tagged with a respective plurality of first training labels;
  - at the image encoder, receiving a plurality of training two-dimensional images that are tagged with a respective plurality of second training labels;
  - at the shared encoder, receiving a plurality of SAR encoder outputs of the SAR encoder and a plurality of image encoder outputs of the image encoder and computing a plurality of shared latent representations based at least in part on the plurality of SAR encoder outputs and the plurality of image encoder outputs;
  - at the classifier, receiving the shared latent representations and computing a respective plurality of classification labels based at least in part on the shared latent representations;
  - computing a value of a loss function based at least in part on the plurality of first training labels, the plurality of second training labels, and the plurality of classification labels; and
  - based at least in part on the value of the loss function, performing backpropagation through the classifier, the shared encoder, the SAR encoder, and the image encoder.

13. The method of claim 12, wherein the SAR encoder includes:
- a first gated recurrent unit (GRU) neural network configured to receive a real component of respective training SAR data included in each of the plurality of training SAR range profiles; and
- a second GRU neural network configured to receive an imaginary component of the respective training SAR data included in each of the plurality of training SAR range profiles.

14. The method of claim 12, wherein the image encoder is a convolutional neural network.

15. The method of claim 12, wherein the shared encoder is a multi-layer perceptron network.

16. The method of claim 12, wherein the loss function includes:
- a SAR classification prediction loss term of the SAR encoder;
- an image classification prediction loss term of the image encoder; and
- a domain agnostic loss term of the SAR encoder and the image encoder.

17. The method of claim 16, wherein the domain agnostic loss term includes a sum of a plurality of Wasserstein distances between a plurality of class conditional distributions of the training SAR range profiles and a corresponding plurality of class conditional distributions of the training two-dimensional images.

18. The method of claim 12, wherein the plurality of first training labels and the plurality of second training labels each indicate vehicles, infrastructure, or terrain features.

19. The method of claim 12, wherein:
- each first training label of the plurality of first training labels identifies a first object located within a first region of interest of a corresponding training SAR range profile of the plurality of training SAR range profiles; and
- each second training label of the plurality of second training labels identifies a second object located within a second region of interest of a corresponding training two-dimensional image of the plurality of training two-dimensional images.

20. The method of claim 12, wherein the plurality of first training labels and the plurality of second training labels have a shared set of unique labels.

* * * * *